US012656925B2

(12) United States Patent
Baram et al.

(10) Patent No.:   US 12,656,925 B2
(45) Date of Patent:   *Jun. 16, 2026

(54) ADAPTIVE USER INTERFACE FOR A MULTIMEDIA CREATIVE DESIGN SYSTEM

(71) Applicant: Wix.com Ltd., Tel Aviv (IL)

(72) Inventors: Michal Baram, Tel Aviv (IL); Gil Amran, Rehovot (IL); Jiri Tobisek, Kfar Vitkin (IL); Leonid Levi, Kyiv (UA)

(73) Assignee: Wix.com Ltd., Tel Aviv (IL)

( * ) Notice: Subject to any disclaimer, the term of this patent is extended or adjusted under 35 U.S.C. 154(b) by 170 days.

This patent is subject to a terminal disclaimer.

(21) Appl. No.: 17/060,118

(22) Filed: Oct. 1, 2020

(65) Prior Publication Data

US 2021/0019006 A1      Jan. 21, 2021

Related U.S. Application Data

(63) Continuation of application No. 16/186,616, filed on Nov. 12, 2018, now Pat. No. 10,795,526, which is a
(Continued)

(51) Int. Cl.
*G06F 3/048*      (2013.01)
*G06F 40/166*      (2020.01)

(52) U.S. Cl.
CPC ............ *G06F 3/048* (2013.01); *G06F 40/166* (2020.01)

(58) Field of Classification Search
CPC . G06F 3/04; G06F 40/15; G06F 3/048; G06F 40/166; G06F 16/958;
(Continued)

(56) References Cited

U.S. PATENT DOCUMENTS 5,555,369 A      9/1996   Menendez
5,623,282 A  *   4/1997   Graham ................ G06F 40/166
                                                      345/672
(Continued)

OTHER PUBLICATIONS

Dreamweaver 8: Getting Started with Dreamweaver, published 2005 by macromedia (Year: 2005).*
(Continued)

*Primary Examiner* — Eric J Yoon
(74) *Attorney, Agent, or Firm* — Heidi Brun Associates Ltd.; Heidi M. Brun

(57)      ABSTRACT

A method for a website building system includes analyzing a user selected portion of a website for editing to determine an editable subset of components. The website includes a multiplicity of pages in a page-based user interface, where the page-based user interface enables editing of the components and where a multi-page container component includes at least one mini-page and a single page container component is empty or includes at least one component. For a non-empty single page container component of said editable subset of components, the method includes placing components contained in the single page container component into a parent page previously containing the single page container component, resulting in an updated page-based hierarchy for the editable subset components.

7 Claims, 10 Drawing Sheets

Related U.S. Application Data continuation of application No. 13/596,146, filed on Aug. 28, 2012, now abandoned.

(60) Provisional application No. 61/573,087, filed on Aug. 31, 2011.

(58) Field of Classification Search
CPC .............. G06F 40/106; G06F 16/9577; G06F 3/04842; G06F 8/38; H04L 67/02
See application file for complete search history.

(56)                    References Cited

U.S. PATENT DOCUMENTS

| | | | |
|---|---|---|---|
| 5,634,125 A | 5/1997 | Li | |
| 5,911,145 A | 6/1999 | Arora | |
| 5,991,534 A | 11/1999 | Hamilton | |
| 6,144,962 A * | 11/2000 | Weinberg | H04L 9/40 |
| | | | 714/E11.181 |
| 6,237,006 B1 * | 5/2001 | Weinberg | G06F 11/323 |
| | | | 714/E11.181 |
| 6,313,835 B1 | 11/2001 | Gever | |
| 6,433,797 B1 | 8/2002 | Zellweger | |
| 7,246,131 B2 | 7/2007 | Lehmann | |
| 7,275,235 B2 | 9/2007 | Molinari | |
| 7,281,248 B2 | 10/2007 | Demsey | |
| 7,340,690 B2 | 3/2008 | Lau | |
| 7,392,510 B1 | 6/2008 | Treder | |
| 7,398,473 B2 | 7/2008 | Stoner | |
| 7,506,273 B2 | 3/2009 | Lahiri | |
| 7,644,356 B2 | 1/2010 | Atkins | |
| 7,672,995 B2 | 3/2010 | Balasubramanyan | |
| 7,707,503 B2 | 4/2010 | Good | |
| 7,813,822 B1 | 10/2010 | Hoffberg | |
| 7,934,164 B2 | 4/2011 | Fukuoka | |
| 8,069,099 B2 | 11/2011 | Chan | |
| 8,132,122 B2 | 3/2012 | Risch | |
| 8,239,759 B1 * | 8/2012 | Sundermeyer | G06F 40/166 |
| | | | 715/255 |
| 8,527,869 B2 | 9/2013 | Hosea | |
| 8,561,008 B2 | 10/2013 | Steiner | |
| 8,577,911 B1 * | 11/2013 | Stepinski | G06F 16/3328 |
| | | | 707/765 |
| 8,850,308 B1 | 9/2014 | Roselander | |
| 2002/0023111 A1 | 2/2002 | Arora | |
| 2003/0229850 A1 * | 12/2003 | Lue | G06F 16/9577 |
| | | | 715/255 |
| 2004/0015782 A1 * | 1/2004 | Day | G06F 40/151 |
| | | | 715/251 |
| 2004/0021699 A1 * | 2/2004 | Fildebrandt | G06F 40/166 |
| | | | 715/854 |
| 2004/0117358 A1 | 6/2004 | von Kaenel | |
| 2004/0250205 A1 | 12/2004 | Conning | |
| 2005/0114324 A1 | 5/2005 | Mayer | |
| 2005/0204276 A1 | 9/2005 | Hosea | |
| 2005/0246341 A1 | 11/2005 | Vuattoux | |
| 2005/0283739 A1 | 12/2005 | Mohr | |
| 2007/0220441 A1 | 9/2007 | Melton | |
| 2008/0148147 A1 | 6/2008 | Poston | |
| 2009/0249239 A1 * | 10/2009 | Eilers | G06F 3/0486 |
| | | | 715/769 |
| 2010/0169331 A1 * | 7/2010 | Karidi | G06F 16/951 |
| | | | 707/E17.046 |
| 2010/0268773 A1 * | 10/2010 | Hunt | G06F 16/9577 |
| | | | 715/245 |
| 2011/0029879 A1 * | 2/2011 | Calvin | G06F 40/106 |
| | | | 715/733 |
| 2011/0202843 A1 | 8/2011 | Morris | |
| 2011/0252305 A1 * | 10/2011 | Tschani | G06F 16/957 |
| | | | 715/234 |
| 2012/0311470 A1 | 12/2012 | Roberts | |
| 2013/0031457 A1 | 1/2013 | Griffiths | |
| 2013/0318066 A1 | 11/2013 | Atherton | |

OTHER PUBLICATIONS

YouTube video by Hampshire College, "Excel 2010: Cut, Copy & Paste," published Oct. 19, 2010, downloaded from https://www.youtube.com/watch?v=bZJM2zXOJVE (Year: 2010).*

Robie, J., "What is the Document Object Model?", published Jun. 10, 2010 as indicated by wayback machine, downloaded from https://www.w3.org/TR/WD-DOM/introduction.html (Year: 2010).*

Stack Overflow website discussion thread, "View HTML source in tree view?", published May 13, 2011 (Year: 2011).*

Grace Gui: "Extending a Web Authoring Tool for Web Site Reverse Engineering",. Master Thesis, 2005.

D. Taniar: "Structured Web Pages Management for Efficient Data Retrieval", IEEE, 2000.

F. Ricca, P. Tonella: "Tools for Anomaly and Failure Detection in Web Applications", IEEE Multimedia magazine, 2006.

* cited by examiner

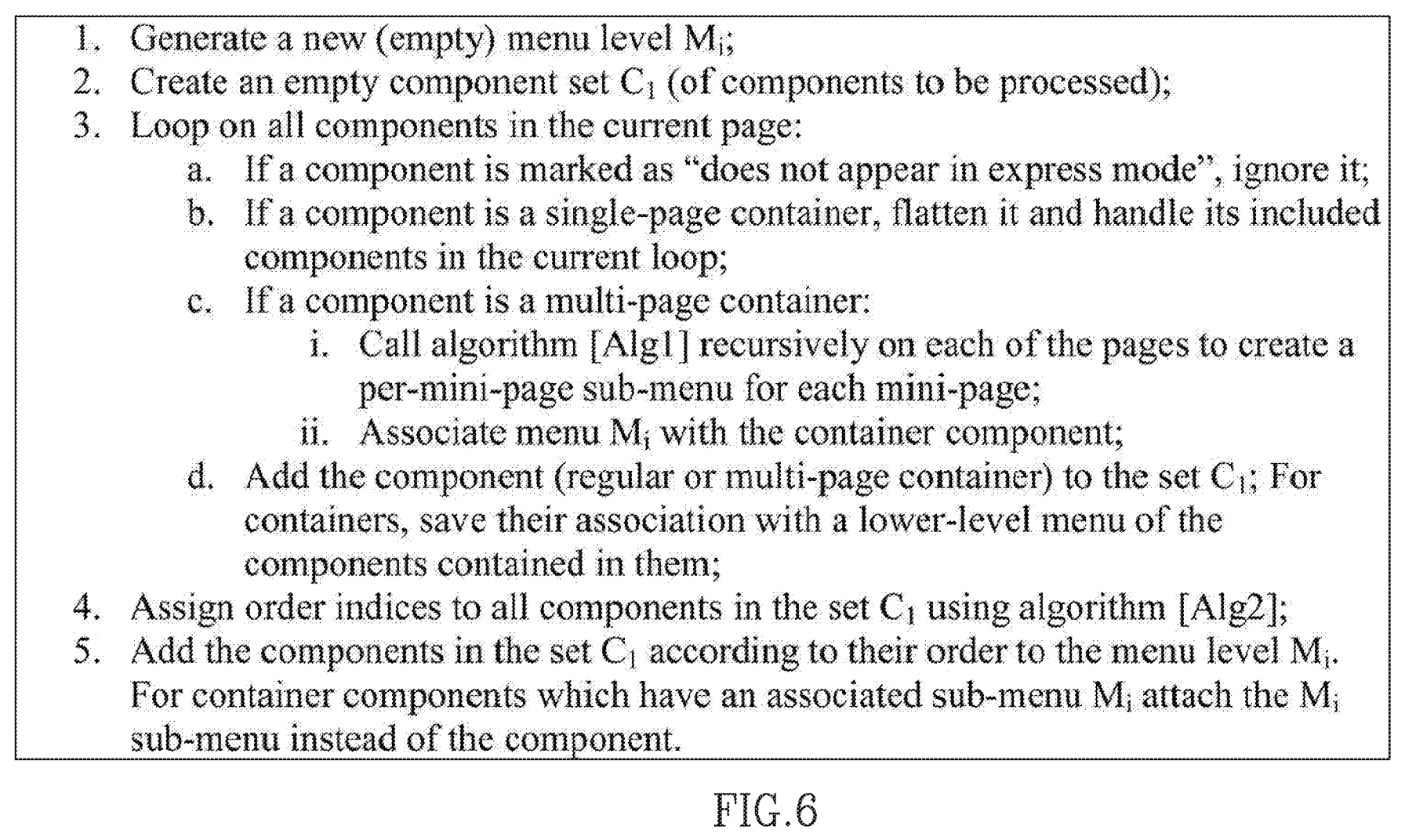

1. Generate a new (empty) menu level $M_i$;
2. Create an empty component set $C_i$ (of components to be processed);
3. Loop on all components in the current page:
   a. If a component is marked as "does not appear in express mode", ignore it;
   b. If a component is a single-page container, flatten it and handle its included components in the current loop;
   c. If a component is a multi-page container:
      i. Call algorithm [Alg1] recursively on each of the pages to create a per-mini-page sub-menu for each mini-page;
      ii. Associate menu $M_i$ with the container component;
   d. Add the component (regular or multi-page container) to the set $C_i$; For containers, save their association with a lower-level menu of the components contained in them;
4. Assign order indices to all components in the set $C_i$ using algorithm [Alg2];
5. Add the components in the set $C_i$ according to their order to the menu level $M_i$. For container components which have an associated sub-menu $M_i$, attach the $M_i$ sub-menu instead of the component.

FIG.6

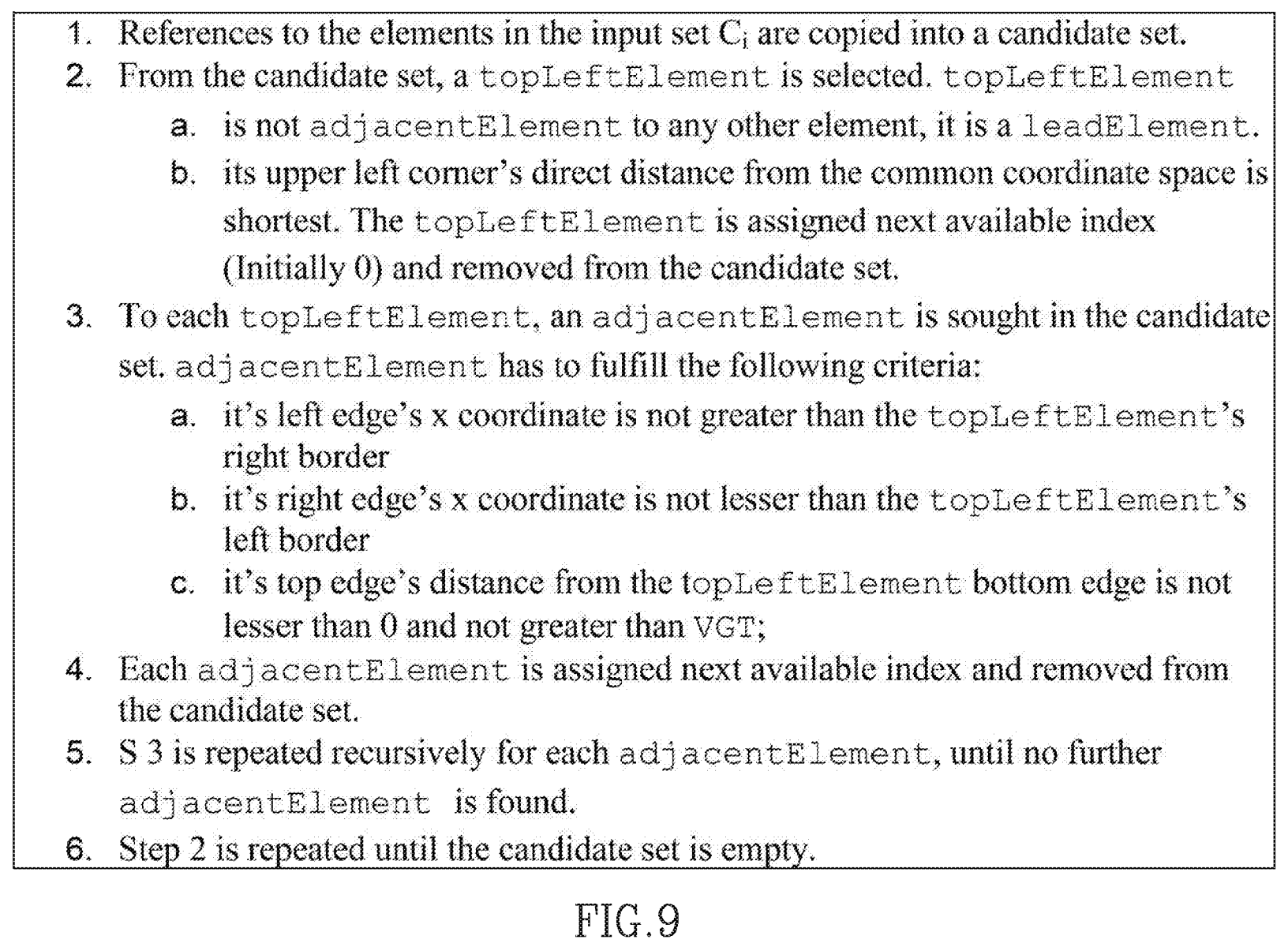

1. References to the elements in the input set $C_i$ are copied into a candidate set.

2. From the candidate set, a `topLeftElement` is selected. `topLeftElement` a. is not `adjacentElement` to any other element, it is a `leadElement`.
   b. its upper left corner's direct distance from the common coordinate space is shortest. The `topLeftElement` is assigned next available index (Initially 0) and removed from the candidate set.

3. To each `topLeftElement`, an `adjacentElement` is sought in the candidate set. `adjacentElement` has to fulfill the following criteria:

a. it's left edge's x coordinate is not greater than the `topLeftElement`'s right border
   b. it's right edge's x coordinate is not lesser than the `topLeftElement`'s left border
   c. it's top edge's distance from the `topLeftElement` bottom edge is not lesser than 0 and not greater than VGT;

4. Each `adjacentElement` is assigned next available index and removed from the candidate set.

5. S 3 is repeated recursively for each `adjacentElement`, until no further `adjacentElement` is found.

6. Step 2 is repeated until the candidate set is empty.

FIG.9

CLOSED

← BACK

C10

C20

C30

C40

C50

OPEN

← BACK

C10

C20

C30

COLOR   FONT

MY STORY.....

C40

C50

ADAPTIVE USER INTERFACE FOR A MULTIMEDIA CREATIVE DESIGN SYSTEM

CROSS-REFERENCE TO RELATED APPLICATIONS

This application is a continuation application of U.S. patent application Ser. No. 16/186,616, filed 12 Nov. 2018, which is a continuation application of U.S. patent application Ser. No. 13/596,146, filed 28 Aug. 2012, which claims benefit from U.S. Provisional Patent Application No. 61/573,087, filed 31 Aug. 2011, all of which are hereby incorporated in their entirety by reference.

FIELD OF THE INVENTION

The present invention relates generally to graphical applications and creations.

BACKGROUND OF THE INVENTION

There are many tools on the market today for creating graphical applications such as websites, catalogs and e-shops. These applications usually allow a user to create the website from scratch or may employ the use of predefined templates provided to the user by the system creator or alternatively by a user community. These templates can usually be edited at will by adding, removing or modifying different elements.

These applications usually consist of multiple pages and mini pages. Each page typically has multiple properties such as size, name, background color, etc. In addition, these pages may also contain elements including components which may be containers, i.e., containing multiple other components, or atomic, i.e. modifiable but not containing other components. Components typically have property sheets which allow the user to control the multiple properties associated with the component such as appearance effects, text color, etc. The appearance and behavior of components can also be modified by various modifiers such as blurring and animation. Components may be fixed, i.e. have a given geometrical shape, be based on a content management system (CMS) (such as a component containing a picture selected from a database) or may be user-specified such as a text area where a user may enter text. Containers may also be based on external information such as a Really Simple Syndication (RSS) feed displaying information from an external data source or the content of a given internet page.

Container components may be nested at a number of levels or may be limited to contain specific types or classes of data (such as a photo album container which may only contain certain formats of pictures). They also may be multi-page in nature with each container containing multiple pages which occupy the same screen area, but with only one of the pages actually displayed at any given moment. Container components may also provide the means for a user to move between different pages through the use of contained components such as navigation buttons.

Components do not necessarily have to occupy mutually exclusive screen regions and may geometrically intersect each other. A component may also be situated completely within the boundaries of another component. The components inside a particular container are always contained within the boundaries of the pertinent container. If the container is moved, it would move with the components logically contained in it, but the move would exclude components which merely lay inside the region of the container but were not logically contained in it.

Editing of the graphical application and its components is typically performed via a graphical user interface (GUI) which may include a component menu, the current page working area and a page manager. The component menu is automatically created based on the components available in the content management system (CMS). Once a component is selected, it can be dragged and dropped into the working area.

Reference is now made to FIG. 1 which illustrates a typical GUI 5 for editing a website. As is shown, part of the component menu may include an icon for clip art 8. When the clip art icon 8 is selected, the user is given a new sub-menu with options for new components such as shapes, lines, animations, etc. These different components, in turn, may be further opened up to show, for example, all the shape components 9 available to the user in the content manager system (CMS). Once a component has been selected, it can be dragged and dropped into a working area, rotated, resized, etc.

SUMMARY OF THE PRESENT INVENTION

There is provided, in accordance with a preferred embodiment of the present invention, a method for a website building system (WBS) implementable on a computing device. The method includes analyzing a user selected portion of a website for editing to determine an editable subset of components. The website includes a multiplicity of pages in a page-based user interface, where the page-based user interface enables editing of the components and where a multi-page container component includes at least one mini-page and a single page container component is empty or comprises at least one component. For a non-empty single page container component of the editable subset of components, the method also includes placing components contained in the single page container component into a parent page previously containing a single page container component, resulting in an updated page-based hierarchy for the editable subset components.

Moreover, in accordance with a preferred embodiment of the present invention, the website is one of a catalog and an e-shop.

Further, in accordance with a preferred embodiment of the present invention, the method also includes filtering the editable subset components for relevance.

Still further, in accordance with a preferred embodiment of the present invention, the analyzing includes scanning a single page at a time.

Additionally, in accordance with a preferred embodiment of the present invention, the analyzing includes scanning page groups.

Moreover, in accordance with a preferred embodiment of the present invention, the scanning does not scan non-container components.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 is an algorithm of the functionality of a component analyzer forming part of the system of FIG. 5, constructed and operative in accordance with the present invention;

FIG. 9 is an algorithm of the functionality of an indexer forming part of the system of FIG. 5;

Figure 1:
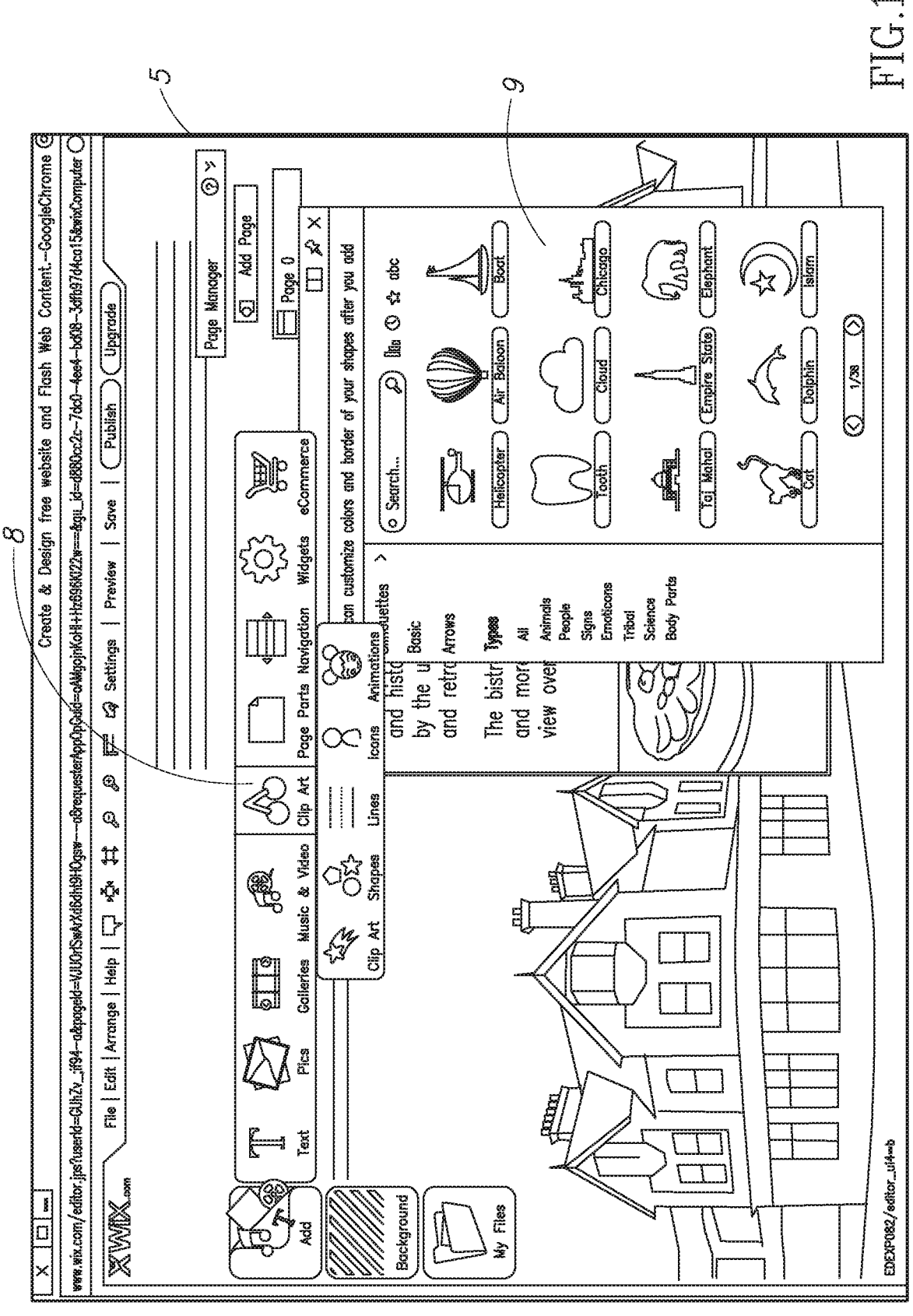
FIG. 1 is an illustration of a typical GUI (graphical user interface) for editing a website.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

When creating a graphical application based on a template, or editing previously created applications, a user may probably need to make modifications to the visual design or replace the internal content of numerous components such as text that is displayed or pictures, etc. For example, when building a website, components that will have text in them often begin with dummy text which serves as a place holder only. Editing of the content is usually performed in place and inside the same screen area occupied by the component, using the display properties of the components (such as color, font etc.).

Figure 2:
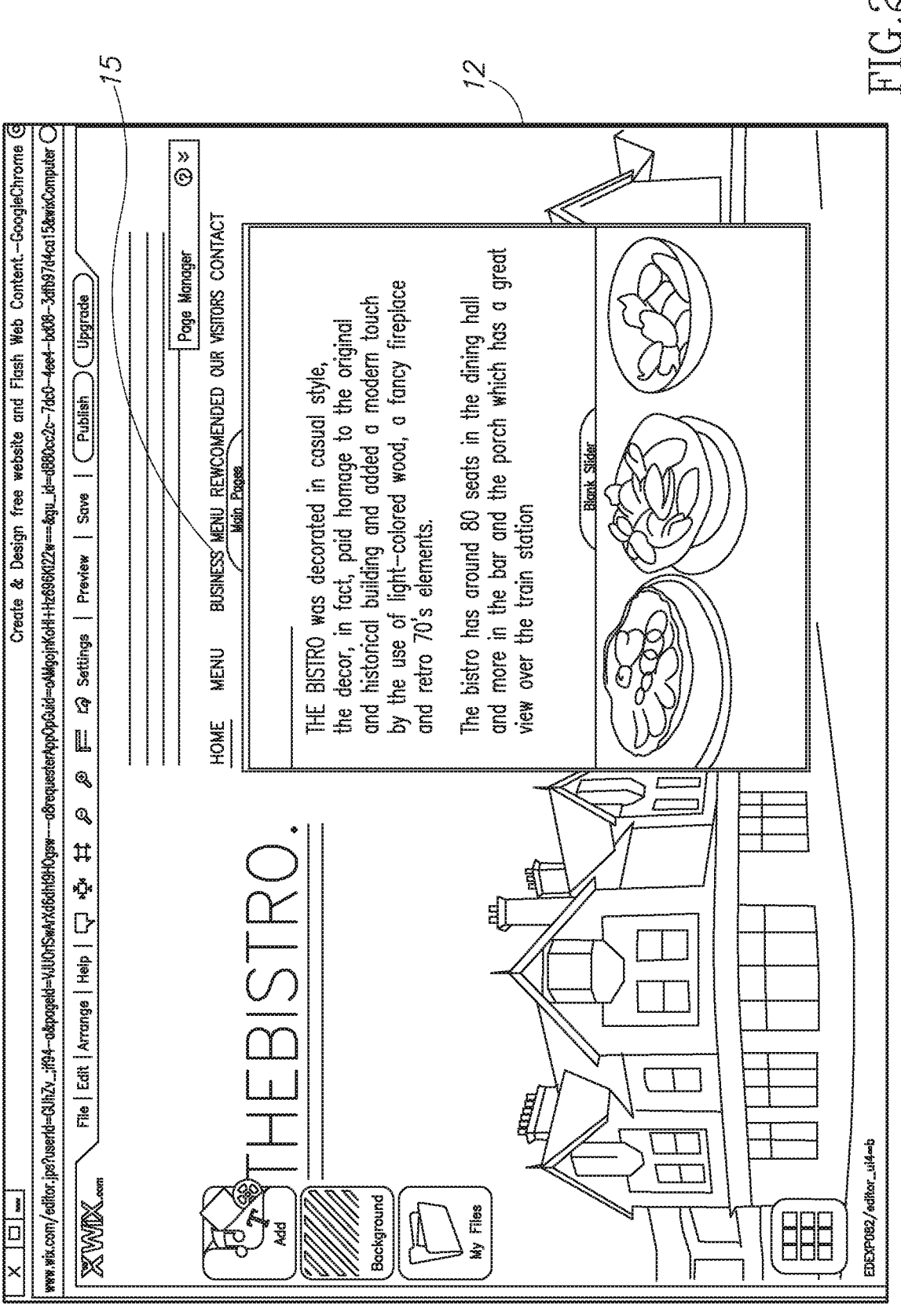
FIG. 2 is an exemplary illustration of an edited website using the GUI of FIG. 1.

Reference is now made to FIG. 2 which illustrates an in-place content and component arrangement 12. As can be seen, the desired screen area for editing, such as the business menu 15, may be obscured or difficult to locate. This may be due to multiple reasons, such as the size of the area allocated to the component, its physical location, the ability of components to hide or overlap each other, etc.

Figure 3:
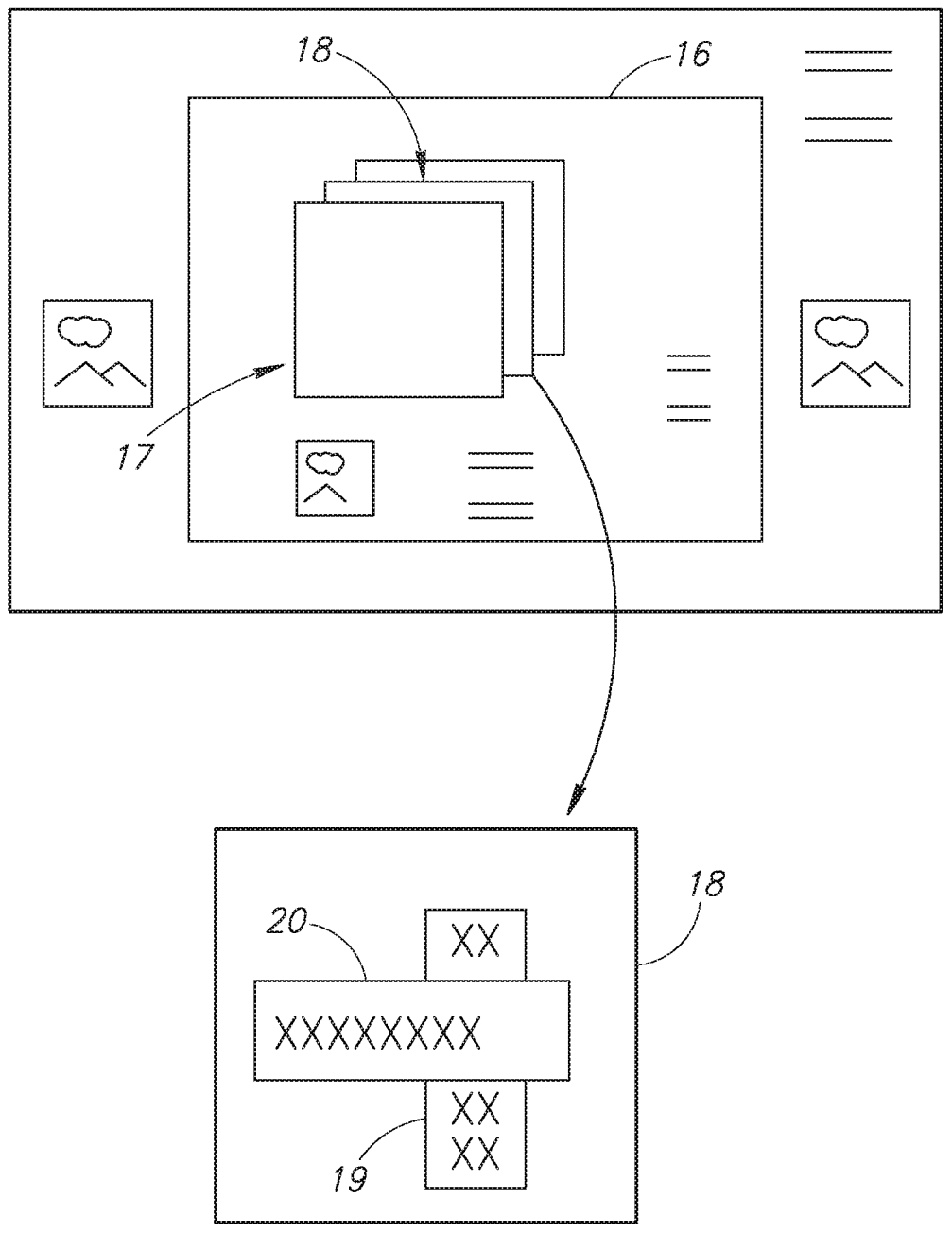
FIG. 3 is a schematic illustration of a webpage and components in a mini-page of the webpage.

Moreover, the arrangement of components within the website may be multidimensional, having both horizontal and vertical locations as well as a tree structured containment relationship, based on the use of various container components. Reference is now made to FIG. 3 which illustrates the different levels of such a multidimensional order. Container 16 may contain a 3-page multi-page container 17 whose second page 18 may contain the component 19 to be edited. Page 18 is shown expanded and illustrates how component 19 may be obscured by component 20. A user may need to maneuver between different components 16, 17, 18 etc. until he arrives at the component 19 that allows him to edit his text.

It will also be appreciated, that when editing or updating such an application, not all components need to be modified (such as navigation elements). These components may still reside in the same area as the components that do require editing, possibly hiding them, intersecting with them or merely obscuring them from being found.

Applicants have realized that, to the builder of a graphical application (such as a website), editing a template that is either manufacturer given or self-created and which may contain multiple pages and components, may become a tedious and frustrating task when using the standard GUI provided with the application. Applicants have further realized that the page-based hierarchical view of the website as described hereinabove, known from herein as a page view, may be converted into a flatter linear hierarchical view of components, from herein known as linear view, which, together with an alternative GUI, may be more user friendly and easier to use.

Figure 4A:
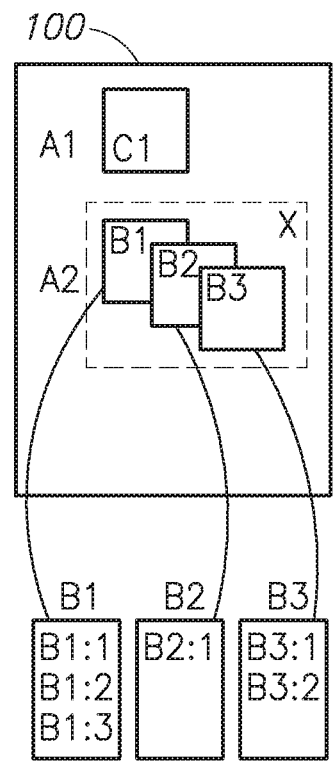
FIGS. 4A and 4B are schematic illustrations of different views of a typical page-based hierarchical website.

Reference is now made to FIG. 4A which illustrates a typical page-based hierarchy 100. An application may contain multiple pages A1 and A2. Page A2 may contain a multi-page container component X containing mini pages B1, B2, and B3. Within the mini pages B1, B2 and B3, the components may be further nested such as B1:1, B1:2, etc. In accordance with an embodiment of the present invention, Applicant has realized that the page-based hierarchy 100 of FIG. 4A which may have a GUI which may offer a page view of the pertinent components may be flattened into a more linear view with a menu of ordered components based on their physical location within the website. This menu may be a natural visual order as is shown in FIG. 4B.

Figure 4B:
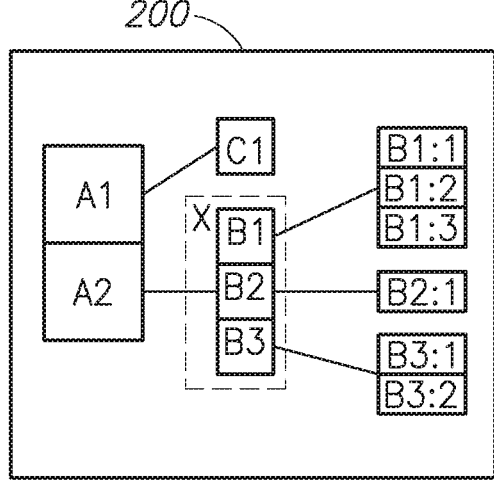

As is illustrated in FIG. 4B, the pages and components A1 . . . C1 and corresponding components B1:1 and B1:2, etc. which may belong to different pages and mini-pages within page-based hierarchy 100, maybe converted into a simpler linear view of components sorted and nested as they appear on the website. Applicant has further realized that this ordered tree of components, from herein known as express mode menu tree (EMMT) 200, together with an appropriate GUI 50, may allow for a user friendlier method of editing the website. GUI 50 is described in further detail herein below.

It will be appreciated that EMMT 200 may be much simpler than page-based hierarchy 100 and that it may be based only on the components for which content entry/editing may be required and may not include the components which are not typically part of the content entry process. It will be further appreciated that EMMT 200 may be dynamically constructed based on an analysis of the components per page. This analysis may be based on the geometrical parameters of all the components as well as their containment relationship in order to create a logical structure closely resembling the order in which a user viewing the system would review and read the content of the components in the page. EMMT 200 may also provide simplified property sheets for each component type showing only those properties required for the content entry stage.

Figure 5:
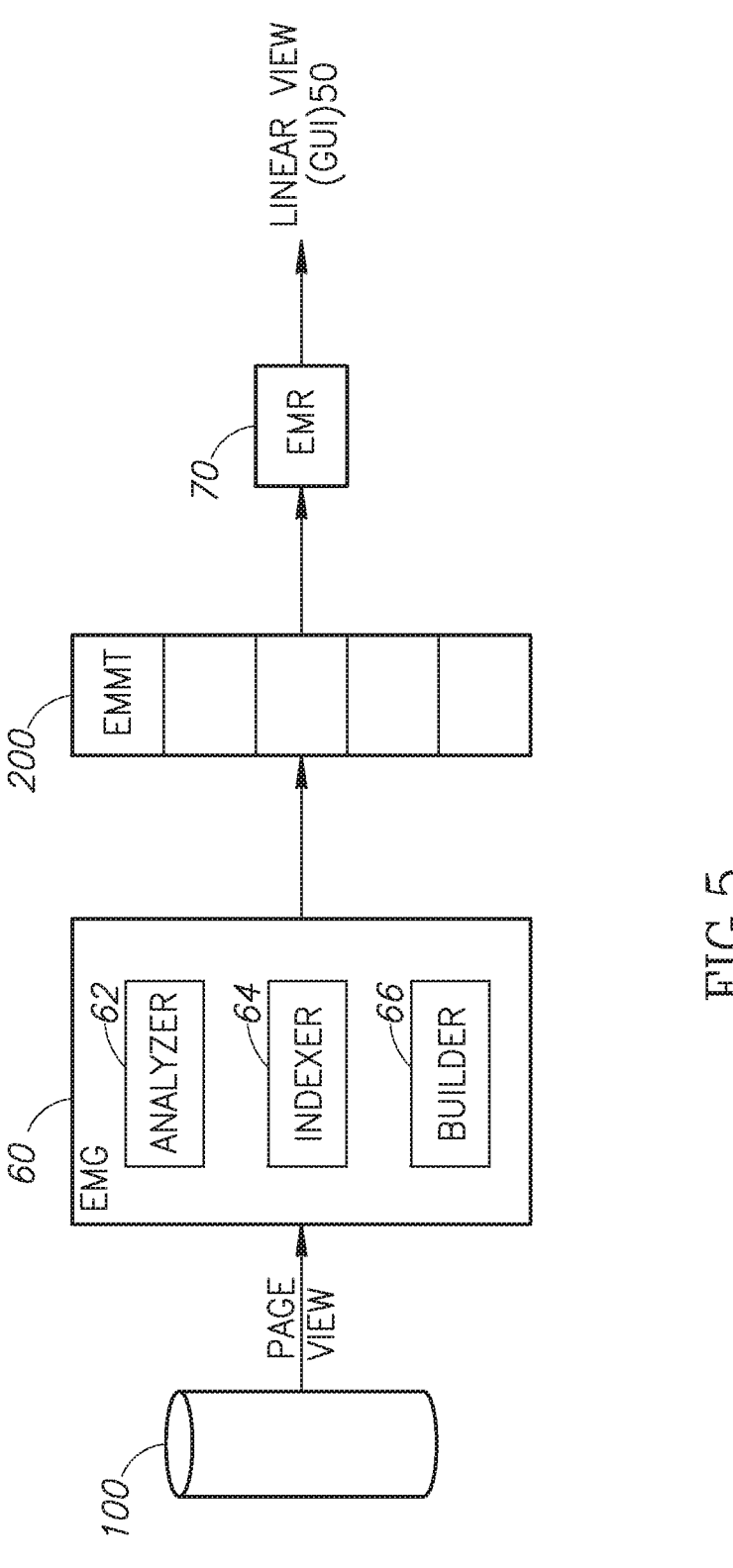
FIG. 5 is a schematic diagram of a conversion system for converting the elements of a page-based hierarchy into a linear hierarchy, constructed and operative in accordance with the present invention.

It will also be appreciated that page-based hierarchy 100 may be converted into EMMT 200 using an express mode generator (EMG) 60 as illustrated in FIG. 5. EMG 60 may comprise component analyzer 62, indexer 64 and menu builder 66. Component analyzer 62 may analyze the component information to extract only pertinent components and may flatten and linearize pages where necessary. Component indexer 64 may index the components and menu builder 66 may order and create the new EMMT 200. According to an embodiment of the present invention, the resultant EMMT 200 may be executed into the final linear view (GUI 50) by express mode runner (EMR) 70. The functionality of EMR 70 is described in further detail herein below. It will also be appreciated that a user may freely switch between the two user interfaces (GUI 10 and GUI 50) and their associated menu systems. When switching from GUI 10 to GUI 50, EMG 60 may recalculate EMMT 200 based on the changed layout and arrangement of the components which may result in a different menu arrangement created. Therefore, a different GUI 50 may be displayed by EMR 70 each time EMG 60 is run.

It will be appreciated that some components may also be pre-classified when initially building up the application as to whether they need to appear in EMMT 200 and therefore seen in GUI 50 or not. An example of this is an arrow shape component for which there is no meaningful user content entry.

Reference is now made to FIG. 6 which illustrates the functionality of component analyzer 62 and indexer 64 as they convert page-based hierarchy 100 into EMMT 200 for the purpose of data entry/editing. It will be appreciated that component analyzer 62 may create a new hierarchical menu ($M_i$) of the components for each page and subpage and that indexer 64 may sort the components within each menu into their logical order.

Component analyzer 62 may create (step 1) a new blank linear menu $M_1$, together with an empty component set $C_1$ (step 2), starting at the top level page of the hierarchy. Component analyzer 62 may then loop through each individual page, analyzing each page in turn for its components (step 3). If a component is already pre-marked as not required to be in express mode, component analyzer 62 may ignore it (step 3a). If a component is a single page container, it may be flattened as described herein below (step 3b). For all other containers, component analyzer 62 may loop (step 3ci) recursively, between the different components within a page and through all the sub-pages where pertinent, creating a new sub menu $M_i$ and an associated component set $C_i$ per page (step 3cii). All the components within the pertinent page whether they are regular or multi-page containers may then be added to the newly created component set $C_i$ (step 3d).

Figure 7:
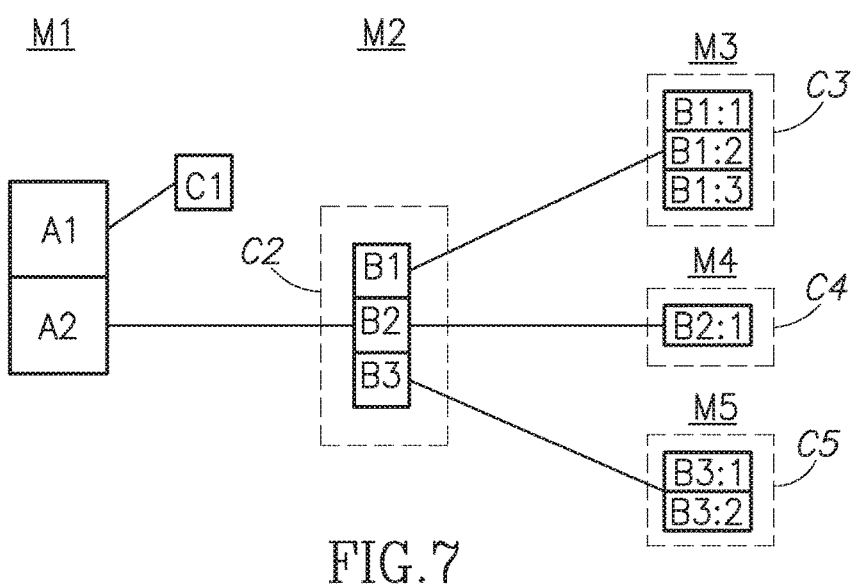
FIG. 7 is a schematic illustration of the creation of menus and component sets for the page-based hierarchy of FIGS. 4A and 4B.

Reference is now made to FIG. 7 which illustrates the creation of menus and component sets for the example of FIG. 4A for the application consisting of pages A1 and A2. Page A1 may be a single page container and its contents may be flattened as described hereinbelow. A component set C1 may be created of all the components situated on the page. Page A2 may contain mini-pages B1, B2 and B3. Mini page B1 may contain components B1:1, B1:2, etc. Component analyzer 62 may loop recursively between the pages from level to level to create a menu with a set of components for each level (step 3cii). For example, for page A2, a menu M2 may be created containing mini pages B1, B2 and B3 (set C2). Since component B1 also contains components B1:1 and B1:2, a new menu M3 is created with a component set C3 containing components B1:1 and B1:2. Likewise, a menu M4 may be created for component B2 with a component set of C4, etc. It will be appreciated that where there is nesting of pages or containers, a menu may be associated with a higher level menu instead of its component set (step 3ciii). Therefore, M2 may be associated with A2 instead of its component set C2. Thus a hierarchy of menus may be created. It will be further appreciated that this hierarchy of menus may form EMMT 200 and may be eventually generated into GUI 50 as described herein below.

Figure 8:
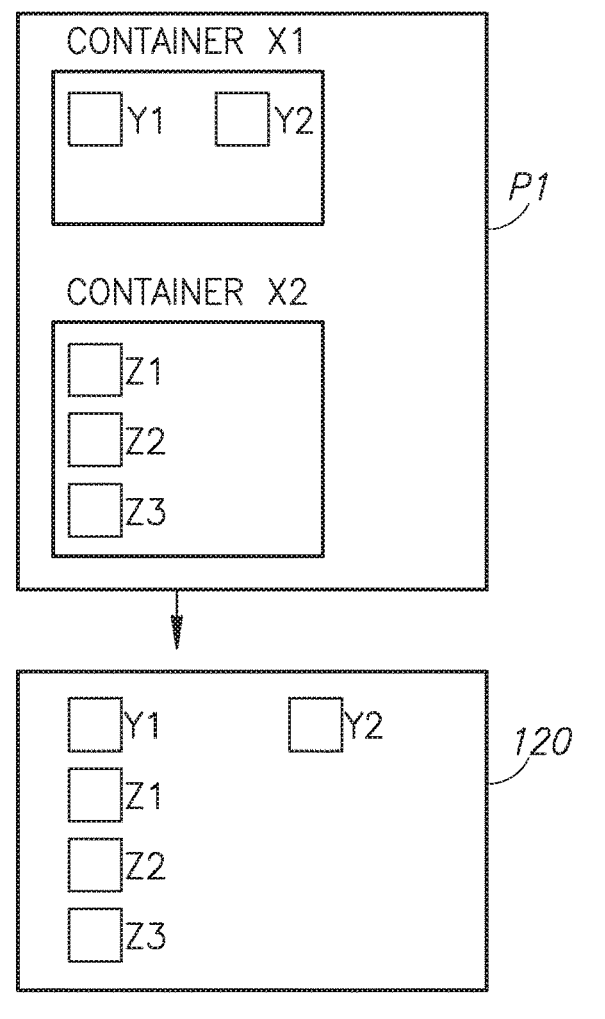
FIG. 8 is a schematic illustration of the process of flattening single page containers, useful in the system of FIG. 5.

It will be further appreciated that single page containers may also be part of the hierarchy. These containers may be "flattened" so that their content (atomic components) is regarded as being part of the main page or the mini page containing them. Reference is now made to FIG. 8 which illustrates the 'flattening' of single page containers. As can be seen, page P1, which contains containers X1 and X2 which further contain components Y1, Y2, Z1, Z2, and Z3, may be flattened into one single component set 120 containing all the components associated with page P1. It will be appreciated that the "flattened" components (Y1, Y2, Z1, Z2, and Z3) may remain in their physical positions' logical order and therefore may be automatically indexed within their component set.

Once each component set $C_i$ has been created, the components within may be indexed by indexer 64 (step 4) using the functionality described herein below. Once indexed, the components in component set $C_i$ may be re-arranged in menu $M_i$ in order, according to their new indices (step 5).

Figure 10:
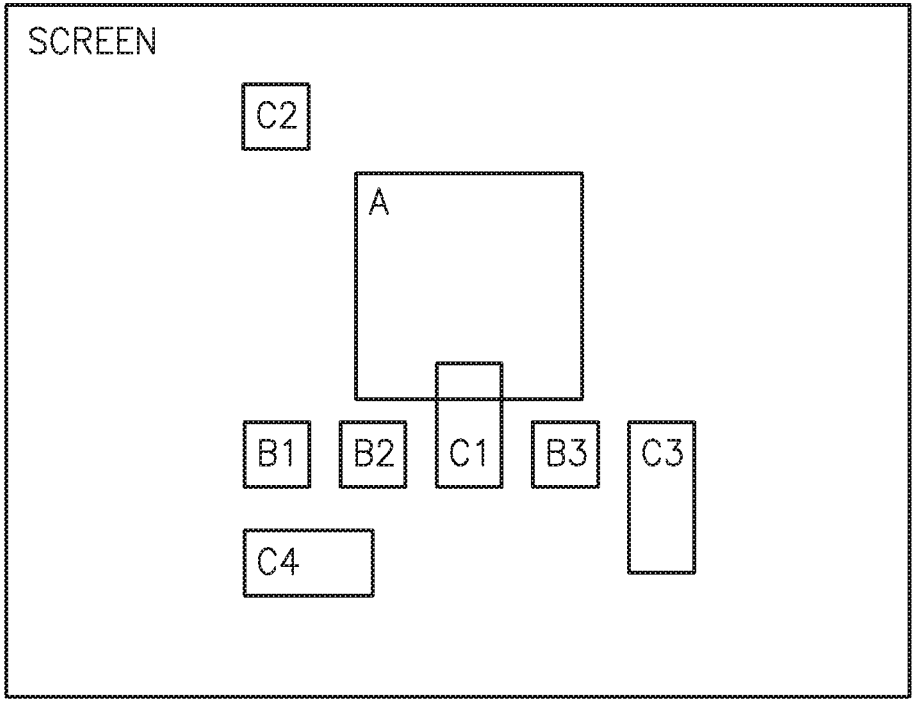
FIG. 10 is a schematic illustration useful in understanding the concept of adjacency.

Reference is now made to FIG. 9 which describes how indexer 64 may take the unordered component set $C_i$ and may assign an order index to each individual component in a single menu level in a visual reading order. It will be appreciated that each menu level may correspond to a single page. It will be further appreciated that indexer 64 may use the concept of a component adjacency non-commutative relationship. A component B is said to be adjacent to a component A if a) B is not completely to the right of A nor completely to the left and b) B's top edge is below A's bottom edge but not more than a predetermined amount of pixels (i.e. a Vertical Grouping Threshold). FIG. 10, to which reference is now made, shows a representation of different levels of adjacency. As can be seen, B1, B2 and B3 are adjacent to A but C1, C2, C3 and C4 are not.

Returning to FIG. 9, indexer 64 may use a global order variable index which may be initially set to zero. References to the elements of input component set $C_i$ may be copied into a new candidate set (step 1). From the candidate set, a top left element is selected according to its coordinates. Indexer 64 may then perform an adjacency test (step 2a). If the element is not adjacent to any other element then it may be considered a lead element. If the distance of its upper left corner from the common coordinate space is the shortest (i.e. it really is the topmost left element), then it is assigned (step 2b) the next available index number (in this case 0) and is removed from the candidate set. For each top left element, indexer 42 may search (step 3) for any adjacent components according to the criteria discussed hereinabove. Once adjacent elements have been found, they are assigned (step 4) the next available index number and are removed from the candidate set. Each adjacent element (in turn) may then become (step 5) the current top left element and its own adjacent elements are sought out by indexer 64. This process is repeated recursively until no more adjacent elements may be found. Once there are no more adjacent elements found in the current loop, the next top left element is found and the process to find any adjacent elements continues (step 3). The whole process is continued until the candidate set is emptied.

It will be appreciated that indexer 64 may index each component set $C_i$ as it is created. Once indexer 64 has completed indexing, hierarchical builder 66 may rearrange the newly indexed components in component set C according to their new indices and may create the new EMMT 200 according to the menus, sub-menus and component sets that have been created.

In an alternative embodiment to the present invention, alternative algorithms may be used by analyzer 62 in order to create EMMT 200 such as the following:

An algorithm which only scans a single page at a time, and does not handle containers within the page (if the system supports them).

An algorithm which scans a single page at a time, and does take into account single page containers.

An algorithm which scans a single page at a time, and handles both single page and multi-page containers.

An algorithm which performs the scan for multiple page groups—be it the entire application or specific page groups within it—and also handles the containers (single or multi-page) within the pages.

In alternative embodiments to the current invention, alternative algorithms may be used to create EMMT 200 based on particular attributes of the components in C1 as described in more detail herein below.

Component type: the algorithm may batch components according to their type, so that (for example), the user initially selects for example, pictures into the page and then fills in the text components.

Component "age" in the page: the algorithm may take the sequence in which components were added into the page into account. Thus (for example), components recently added to a page will be placed in EMMT 200 after the components previously existing in the page.

Component inheritance history: in systems which support inheritance relationship between the pages or the components, the algorithm may batch components inherited from a given template page or component together instead of intermixing them with the specific components added in a specific page inheriting from the template page or component.

Component size: the algorithm may batch together (for example) the larger components, and only then may batch the smaller components in the page.

Component shape: the algorithm may batch components according to their shape. This may be significant in cases in which the shape may provide substantial indication as to the use of each component.

Component display priority (z-order): the algorithm may batch components according to their z-order, so that (for example) components which are "in front" are filled in before the components fully or partially occluded by the components "in front".

Components' actual usage in the created application: the algorithm may base the batching of the components on their actual usage information, i.e. which components have been filled with data. This could be done (for example) in a template based system based on the actual usage pattern for the various components in other application pages inheriting from the same template as the current page being analyzed.

Components' formatting information: the algorithm may batch together components based on their formatting information, such as (for example) the style sheet used to format the text in text components inside the page. This could be based on the specific style selected (e.g. batch all components having the style "heading text"), or on specific properties of the style (e.g. batch all components displayed in italics and size 16 font).

Actual content of component (e.g. text, picture): the algorithm may use the actual content of the component to determine their order in EMMT 200. For example, components that have a label property may be batched together according to the similarity of the label (e.g. "patient ID", "patient name" and "patient birth date").

Native language reading order: the algorithm may take into account the natural reading order of the language of the specific application or page in systems built according to an embodiment of the invention which may allow multiple language specification at the application or page level. Thus, the natural reading order for pages whose main language is English would be top-to-bottom and then left-to-right, whereas pages written in Semitic languages or Far-East languages would use a different order.

Inter-page component association: the algorithm may take into account pre-defined associations between components on the same page. For example, a text button component may control the display and hiding of a given text area component. In one instance of the given page the button should have the text "display license agreement" and the text area should have the text of the license agreement. In another instance of the same page the button should have the text "display product credits" and the text area should have the text of the product credits. The algorithm may also use the procedural association between the two components and place them together so that the user would type the text for the two components in sequence.

User defined hints: a system built according to an embodiment of the invention may include component properties used specifically to provide hints to component analyzer 42. These properties could be specified by the user preparing a template page, and would later be used by the algorithm to determine the optimal batching arrangement of the components. For example, in a real-estate application displaying a per-house page, the components containing data related to a house could be tagged with a "house" grouping property, and these related to the yard be tagged with a "yard" grouping property. The algorithm may then use the information to batch the house-related components together and the yard-related components together, in order make data entry more intuitive.

Combined batching criteria: the algorithm may combine any number of batching criteria (such as the ones mentioned) using any type of weighted average formula to create an ordering index for EMMT 200 construction. Thus, the algorithm may use (for example) the component position together with its type information and information about recent usage to batch together components and specify their order.

It will be appreciated that in this manner, a visual multi-dimensional hierarchy may be converted into a more linear hierarchical view in order to facilitate content entry into template design and editing. It will be appreciated that that the completed EMMT 200 may be generated into a GUI by EMR 70. It will further be appreciated that EMR 70 is a parameterized GUI display sub-system which may display an active GUI based on the data structure as defined by EMMT 200. It may handle the display of open and closed menus as well as simplified property sheets and data entry areas.

Figure 11:
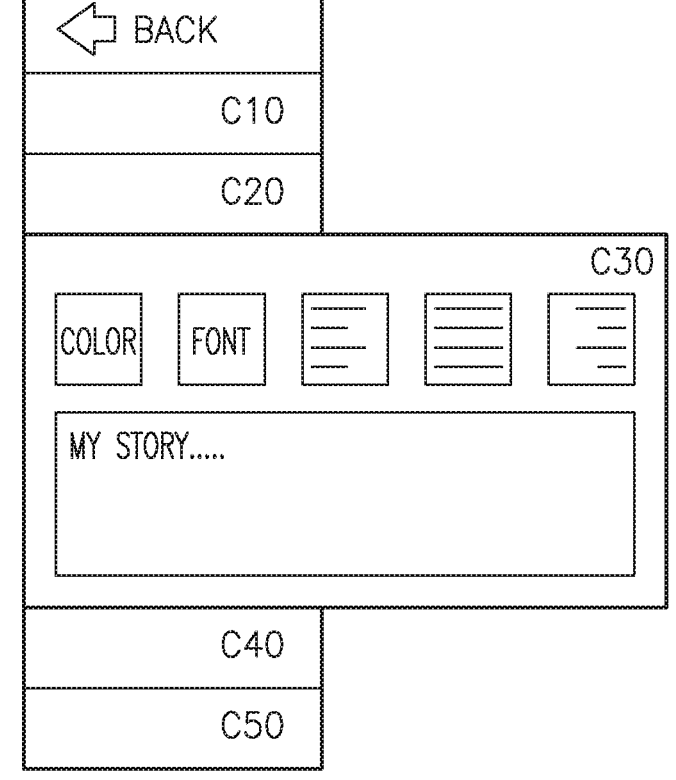
FIG. 11 is a schematic illustration of a linear hierarchical view including a linear view simplified property sheet, constructed and operative in accordance with the present invention.

Reference is now made to FIG. 11 which illustrates how GUI 50 for the newly created EMMT 200 may appear to a user. The current menu levels are displayed and the user may select any menu entry representing a component. If the component is a multipage container, the menu entry points to the options for the next 'layer' of menus. If the component is regular, the express mode property sheet for the entry may be opened ready for editing. For example, as illustrated in FIG. 11, when the menu is 'closed', all that can be seen are the top level components (C10 . . . C50). Once (for example) component C30 has been selected, the express mode property sheet is opened showing a text entry area, color options, font options, text justification options, etc.

In an alternative embodiment to the present invention, the express mode property sheet may be located near (such as to the side of) of the relevant component and not inside the menu.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, client/server system or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:

displaying a first GUI comprising a representation of a website page having representations of a plurality of website containers nested within said representation of said website page, and the first GUI further comprising representations of a plurality of editable components that are within said website page, each of said representations of said plurality of editable components being nested within one of said representations of said plurality of website containers, wherein at least one of said plurality of editable components includes text or images and wherein said representations of said website containers and said representation of said website page each graphically depict a container; and receiving user input that activates a display of a second GUI based on said plurality of editable components in said first GUI, said second GUI comprising representations of parent container components, said representation of said website page, said representations of said plurality of website containers, and said representations of said plurality of editable components, wherein in said second GUI relative to said first GUI:

said representations of said plurality of editable components are no longer nested within said representations of said plurality of website containers and have been placed into said representations of said parent container components; and said representations of said plurality of website containers are no longer nested within said representation of said web page and have been placed outside said representation of said web page; and wherein in said second GUI, said representations of said editable components of said website page and said representations of said plurality of website containers remaining in said second GUI are connected via graphical links in a tree arrangement in said second GUI to indicate linear, hierarchical relationships therebetween.

2. The method according to claim 1 wherein said website page includes one of a catalog and an e-shop.

3. The method according to claim 1, further comprising filtering said plurality of editable components for relevance.

4. The method according to claim 1, further comprising scanning a single page at a time.

5. The method according to claim 4 wherein said scanning does not scan non-container components.

6. The method according to claim 1, further comprising scanning page groups.

7. The method according to claim 6 wherein said scanning does not scan non-container components.

* * * * *